United States Patent [19]

Berbalk

[11] Patent Number: 4,535,661

[45] Date of Patent: Aug. 20, 1985

[54] POWER-DRIVEN STEADY REST FOR LATHES

[75] Inventor: Hermann Berbalk, Göppingen, Fed. Rep. of Germany

[73] Assignee: Oerlikon-Boehringer GmbH, Goppingen, Fed. Rep. of Germany

[21] Appl. No.: 559,415

[22] Filed: Dec. 8, 1983

[30] Foreign Application Priority Data

Dec. 10, 1982 [DE] Fed. Rep. of Germany ....... 3245790

[51] Int. Cl.³ ............................................... B23B 5/22
[52] U.S. Cl. .................................... 82/40 R; 82/38 R; 82/40 A; 384/255; 384/462; 384/549
[58] Field of Search .................. 82/40 R, 40 A, 39, 9, 82/38 R, 45, 8, 30; 409/199, 200; 279/1 J; 384/255; 308/203, 204, 187

[56] References Cited

U.S. PATENT DOCUMENTS

| | | | |
|---|---|---|---|
| 869,629 | 10/1907 | Fleming | 308/203 |
| 1,067,143 | 7/1913 | Schellenbach | 82/38 R |
| 1,263,964 | 4/1918 | Thropp | 308/203 |
| 1,806,545 | 5/1931 | Ludwick | 308/203 |
| 2,106,501 | 1/1938 | Groene | 82/40 A |
| 2,396,841 | 3/1946 | Flygare | 82/40 R |
| 3,467,450 | 9/1969 | Schmidt et al. | 308/203 |
| 3,504,952 | 4/1970 | Farmer | 384/255 |
| 3,635,103 | 1/1972 | Monti | 384/255 |

OTHER PUBLICATIONS

Mechanical Engineering Design, Shigley, McGraw-Hill, 1977, pp. 333-335.

Primary Examiner—Leonidas Vlachos
Assistant Examiner—Jerry Kearns

[57] ABSTRACT

The invention relates to a power-driven steady rest for lathes, especially crankshaft turning machines, having a drive gear encompassing the workpiece, in which there is disposed a chuck for holding the workpiece and which is held on both sides adjacent the outer circumference by a bearing in a supporting plate fastened to the machine bed. The drive gear bearing is improved with regard to load bearing capacity and rotatory speed capability by the fact that the bearing consists of individual roller bearings, each of which is formed of a roller and a roller holder fastened to the supporting plate.

12 Claims, 3 Drawing Figures

POWER-DRIVEN STEADY REST FOR LATHES

BACKGROUND OF THE INVENTION

The invention relates to a power-driven steady rest for lathes, especially crankshaft turning machines, which has a drive gear encompassing the workpiece to be machined, has a chuck for holding the workpiece, and is held on both sides adjacent the outer circumference by a bearing in a supporting plate fastened to the machine bed.

A lathe in the form of a crankshaft turning machine with a power-driven steady rest was disclosed in the manufacturer's brochure entitled "VDF Produktions-Kurbelwellen-Dreh-maschinen KD 1365" published in 1977. In machines of this kind a crankshaft is mounted in centers at its extremities for the machining of the main bearings and crank cheeks and is driven in rotation by means of a powered steady rest at the center of the crankshaft. The steady rest has a drive gear in which a chuck is disposed in which a crankpin of the crankshaft is placed, and transmits the drive torque to the crankshaft. The drive gear is supported on both sides by taper roller bearings of a conventional type. The outer race of the bearing is seated in a supporting plate screwed to the lathe bed, and the inner race rotates with the drive gear. On account of the very limited amount of space available, these bearings are very thin-walled, and their rotatory speed is limited by their large diameter. These bearings must withstand both radial and axial thrusts. The rotatory speeds that can be achieved with such bearings are too low, in the present state of the art, to achieve a very short machining time with modern carbide turning tools.

It is the object of the invention to improve the support of the drive gear of a power driven steady rest of this kind with regard to load bearing capacity and rotatory speed capability.

BRIEF DESCRIPTION OF THE INVENTION

This object is achieved by the invention by the fact that the bearing consists of individual roller bearings each of which is formed by a roller and a roller holder fastened to the supporting plate.

On the basis of the proposed design, the drive gear is not held on both sides by a single bearing, but by a plurality of individual roller bearings which are fastened separately to the supporting plate and capable, as a compact unit, of withstanding greater loads and of being used at high rotatory speeds.

It is not necessary that the roller bearings extend on both sides over the entire outer circumference of the drive gear. Instead, it is possible to provide no roller bearings at all in the area which must be accessible to the tools used for the machining of main bearings between main bearings. In this case, the supporting plate can have horizontal cutouts in this area, so that the main bearings that are to be machined are accessible over their entire axial length.

Figure 1:
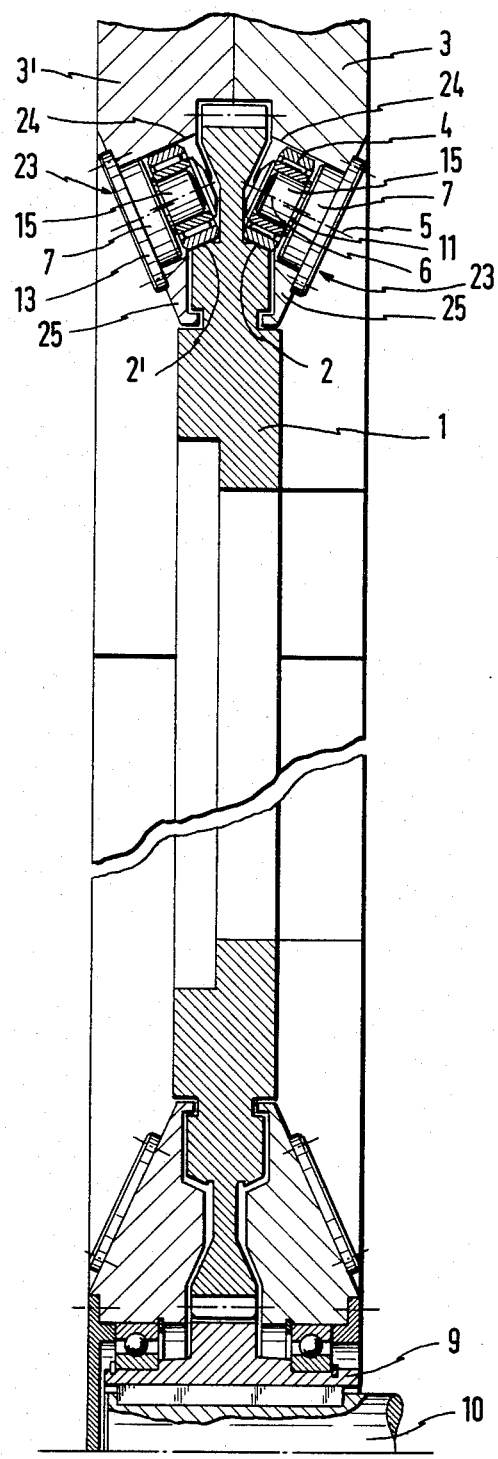
FIG. 1 is a cross-sectional view of the drive gear.
Figure 2:
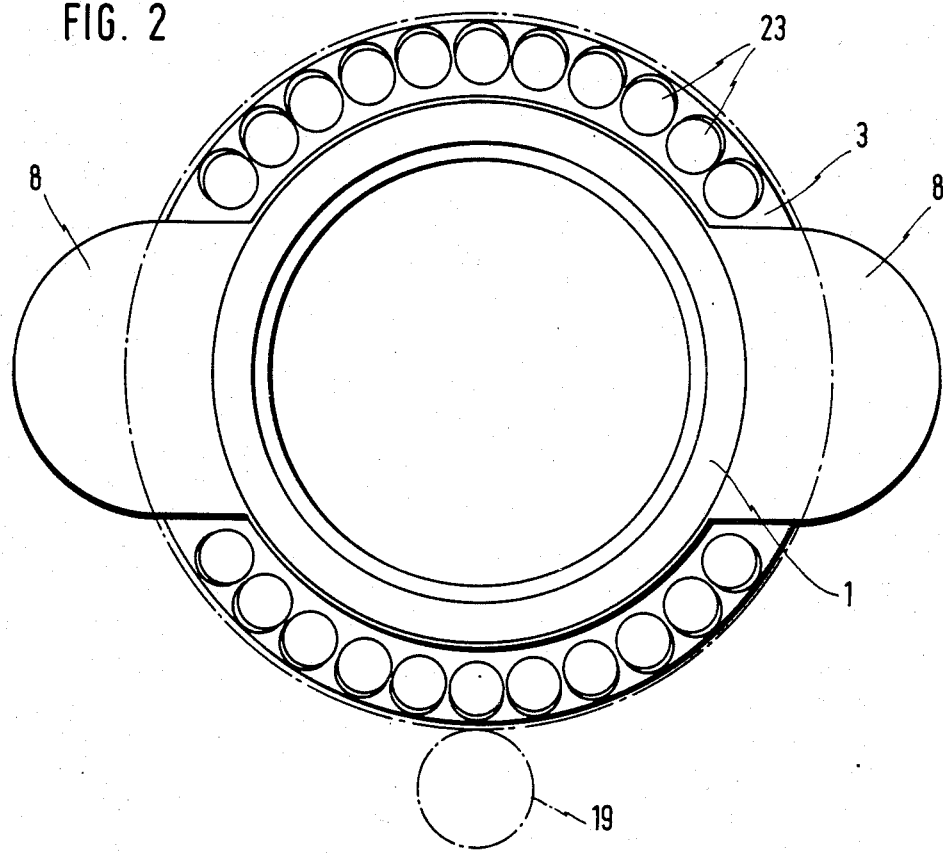
FIG. 2 is an elevational view of the supporting plate.

As indicated in FIGS. 1 and 2, the driven steady rest consists of a rectangular, two-part supporting plate 3, 3', which can be bolted to the bed of a crankshaft turning machine, and in which a drive gear 1 is journaled. In a central opening, the drive gear 1 can accommodate a chuck, which is not shown, for holding a crankshaft for turning. The drive gear 1 meshes with a pinion 9 on a drive shaft 10.

The bilateral support of the drive gear 1 in the supporting plate 3, 3', consists of individual roller bearings 23. The roller bearings 23 are distributed over the outer circumference of the drive gear 1, but the supporting plate 3, 3', has horizontal cutouts 8 in an area situated on both sides of the horizontals through the plane of the drive gear 1. The horizontal cutouts 8 serve to make the main bearings accessible for machining in the area of the steady rest, so that the main bearings can be machined over their entire axial length.

Figure 3:
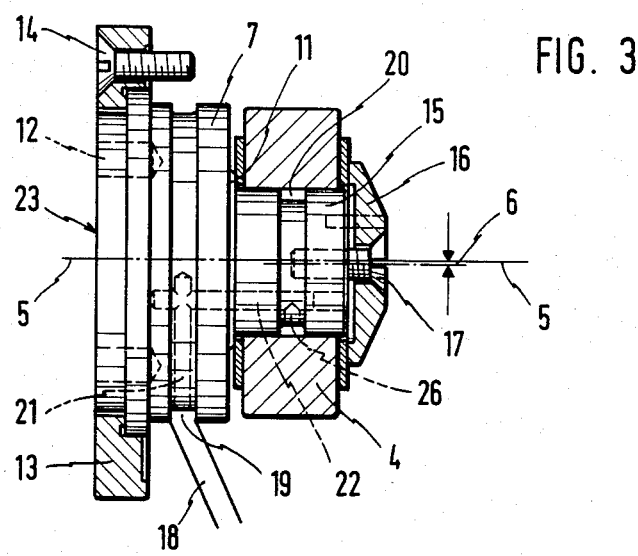
FIG. 3 is a partially sectional side view of a single roller bearing.

As indicated in FIGS. 1 and 3, each roller bearing 23 has a roller holder 7 having a cylindrical hub 15 on which a roller 4 is mounted. As shown especially in FIG. 3, the central axis 5 of the roller holder 7 and the central axis 6 of the cylindrical hub 15 and thus also the roller 4, are parallel to and offset from one another, so that an excentricity results between each roller 4 and the corresponding roller holder 7. Thus, the clearance between the supporting plate 3, 3', and the drive gear 1 can be adjusted by turning the roller holder 7. The adjustment of a roller holder 7 can be performed by means of a key wrench inserted in openings 12 in the roller holder 7.

The axes 5 and 6 of the roller holder 7 and hubs 15 and rollers 4, respectively, are at an angle to the central axis of the drive gear 1, so that the roller bearings 23 can bear both axial and radial thrusts. For this purpose, sloping races 24 are formed on the supporting plate 3, 3', and sloping races 2, 2', on the drive gear.

Each roller bearing 23 is held on the supporting plate 3, 3', by a ring 13 encompassing the roller holder 7. The rings 13 are fastened to the supporting plate 3, 3', by screws 14. Radially inside of each roller bearing 23 the supporting plate 3, 3', has a section 25 which engages in an annular groove in the drive gear 1. The roller bearings are thus held firmly in the supporting plate 3, 3', on their entire circumference. The roller 4 of a roller bearing 23 is held on the cylindrical hub 15 by means of a cap 16 fastened by a screw 17, and on the opposite side rests against an abutment rim 11 of the roller holder 7.

The bearings are lubricated through a diagrammatically indicated passage 18 which opens into an annular groove 19 in the roller holder 7. The annular groove 19 communicates with a passage 21 made perpendicular to the axis 5, and this passage in turn is connected to an axial passage 22 which extends into the hub 15 and is connected by a perpendicular passage 26 to an annular groove 20 on the hub 15.

I claim:

1. In a power driven steady rest for a lathe, especially for a crankshaft turning machine: a supporting plate to be fastened to a machine bed of the lathe; a drive gear rotatably supported in said plate for encompassing a workpiece to be machined, and having means for receiving a chuck for holding a workpiece; said drive gear having an axis; means drive said driving gear; and bearing means rotatably supporting said gear on opposite sides adjacent its outer circumference in said supporting plate, said bearing means comprising two sets consisting of a plurality of individual roller bearings respectively on opposite sides of said drive gear; the roller bearings of each set being closely spaced with respect to each other and extending around a major part of the circumference of the drive gear; each of said bearings being formed by a roller and a roller holder fastened to said supporting plate, the rollers having axes at an oblique angle to the axis of the drive gear, and having obliquely angled races disposed on the supporting plate and on the drive gear.

2. A steady rest according to claim 1, wherein each roller holder has a cylindrical hub on which the respective roller is mounted.

3. A steady rest according to claim 2, wherein the axis of each roller holder is parallel to the roller axis and to the axis of the cylindrical hub of the roller holder, so that the roller holder and roller are disposed excentrically from one another.

4. A steady rest according to any one of claims 1 to 3, comprising rings for fastening the roller holders to the supporting plate, said rings encompassing the roller holders.

5. A steady rest according to claim 4, comprising screws for fastening said rings to said supporting plate.

6. A steady rest according to claim 3, wherein said roller holders have openings for the insertion of a key wrench by means of which the excentricity between the roller holders and the rollers is adjustable.

7. A steady rest according to claim 1, wherein the roller bearings are distributed only partially over the circumference of the drive gear.

8. A steady rest according to claim 7, wherein an area extending on both sides of the horizontal extending through the plane of the drive gear is free of roller bearings.

9. A steady rest according to claim 7 or 8, wherein said supporting plate has horizontal cutouts.

10. A steady rest according to claim 2, comprising caps holding the rollers on the cylindrical hubs.

11. A steady rest according to claim 1, wherein each roller holder has an abutment rim for the respective roller.

12. A steady rest according to claim 2, wherein the roller holders and their hubs have lubricant grooves and lubricant passages.

* * * * *